No. 677,674. Patented July 2, 1901.
C. J. MANNING.
RECORDING GAGE OF STEAM PRESSURE ON BOILERS.
(Application filed Jan. 2, 1901.)
(No Model.) 3 Sheets—Sheet 1.

No. 677,674. Patented July 2, 1901.
C. J. MANNING.
RECORDING GAGE OF STEAM PRESSURE ON BOILERS.
(Application filed Jan. 2, 1901.)
(No Model.) 3 Sheets—Sheet 2.

No. 677,674. Patented July 2, 1901.
C. J. MANNING.
RECORDING GAGE OF STEAM PRESSURE ON BOILERS.
(Application filed Jan. 2, 1901.)
(No Model.) 3 Sheets—Sheet 3.

UNITED STATES PATENT OFFICE.

COLEMAN J. MANNING, OF MEDFORD, MASSACHUSETTS, ASSIGNOR TO THE AMERICAN STEAM GAUGE COMPANY, OF BOSTON, MASSACHUSETTS.

RECORDING-GAGE OF STEAM-PRESSURE ON BOILERS.

SPECIFICATION forming part of Letters Patent No. 677,674, dated July 2, 1901.

Application filed January 2, 1901. Serial No. 41,802. (No model.)

*To all whom it may concern:*

Be it known that I, COLEMAN J. MANNING, a citizen of the United States, residing at Medford, in the county of Middlesex and Commonwealth of Massachusetts, have invented a new and useful Improvement in Steam-Gages, of which the following is a specification.

My invention relates to steam-gages for indicating the steam-pressure on boilers and recording the variations thereof from the working pressure that the engineer in the discharge of his duty is required to maintain; and the object of my invention is to furnish a gage that will perform its functions of indicating and recording, as stated, with greater accuracy and less liability to derangement than usual, and one that will, by independent mechanisms for indicating the pressure and recording its variations, detect readily its own errors, if any, and lead to their prompt correction. I attain said objects by means of the mechanism illustrated in the accompanying drawings, in which—

Figure 1:
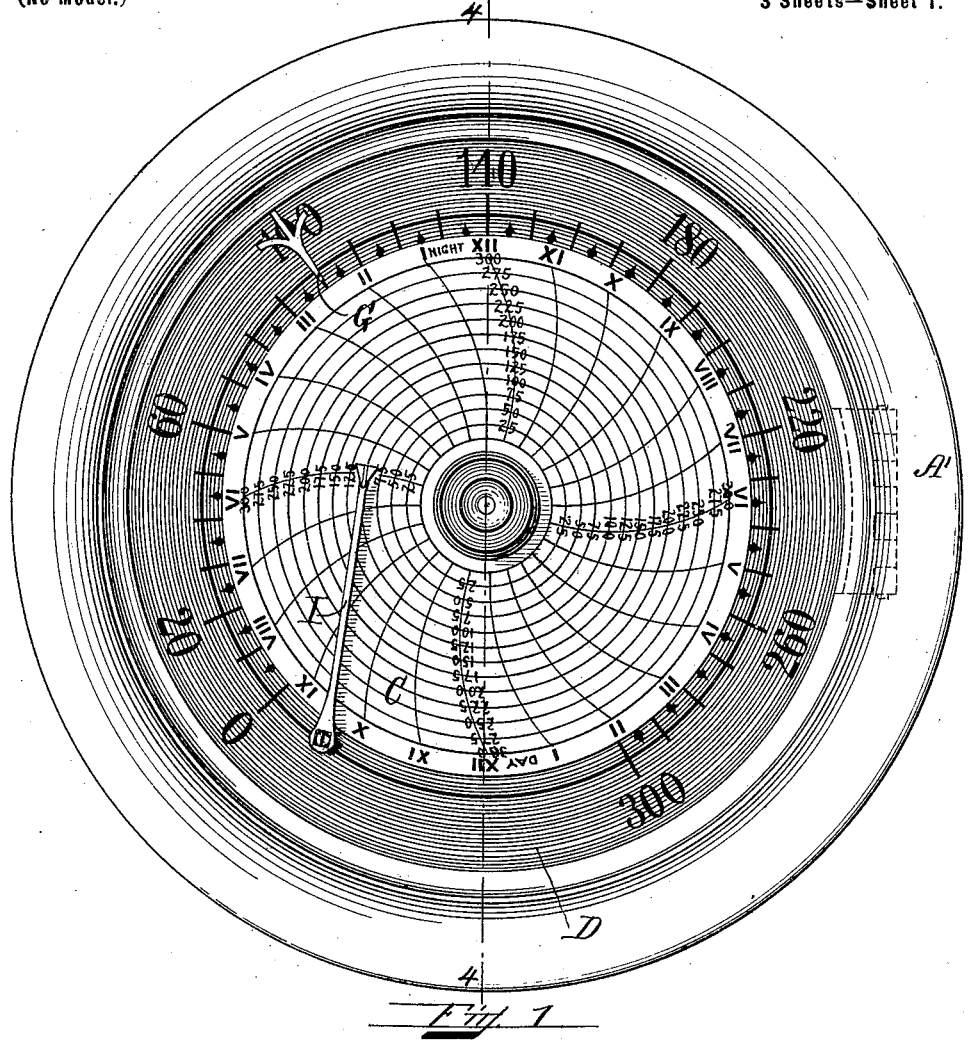
Figure 4:
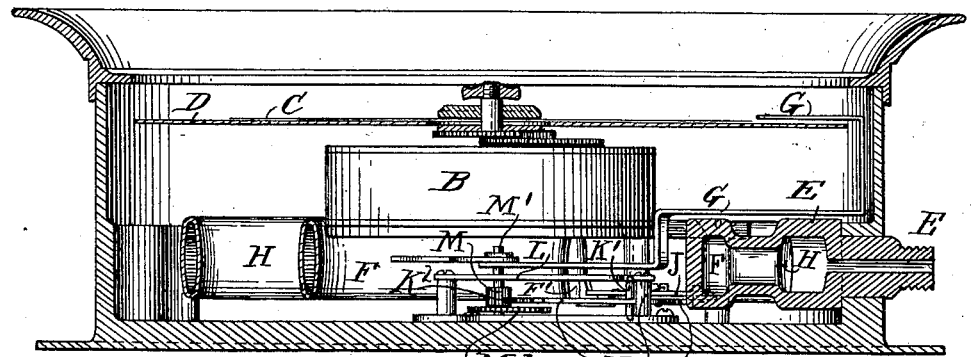
Figure 2:
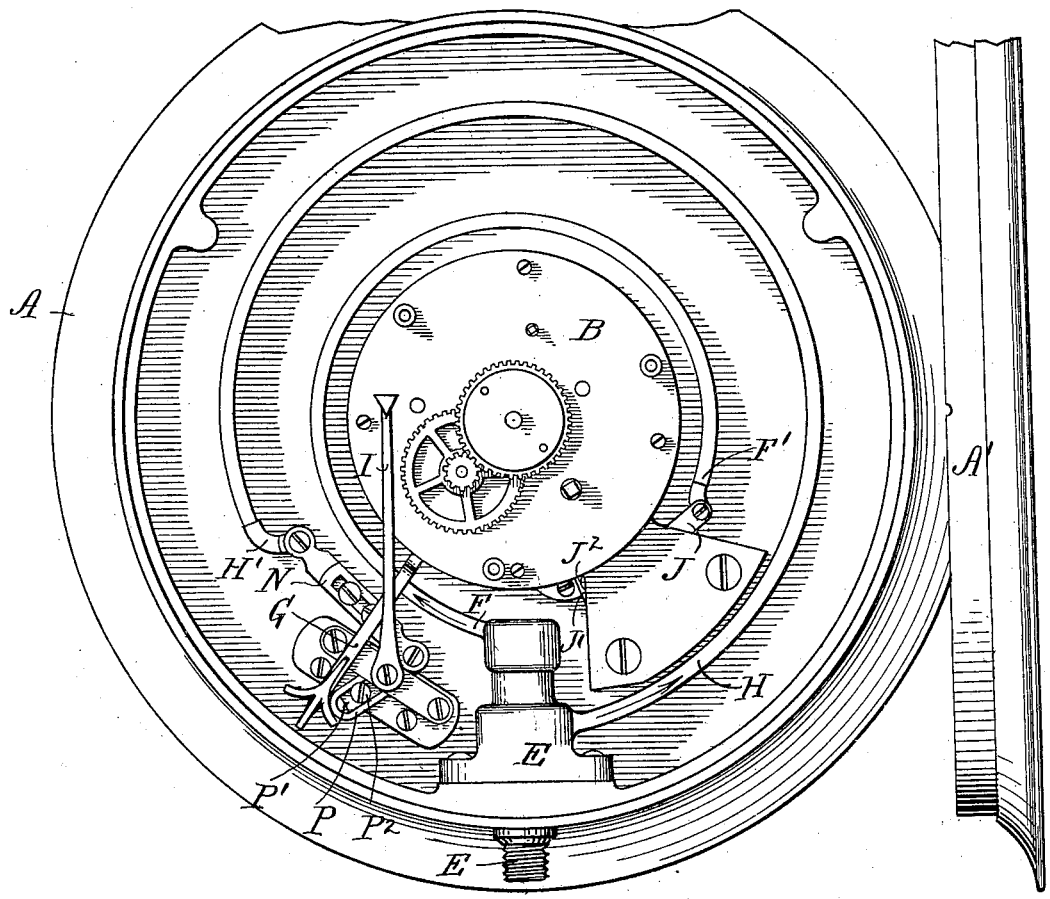
Figure 5:
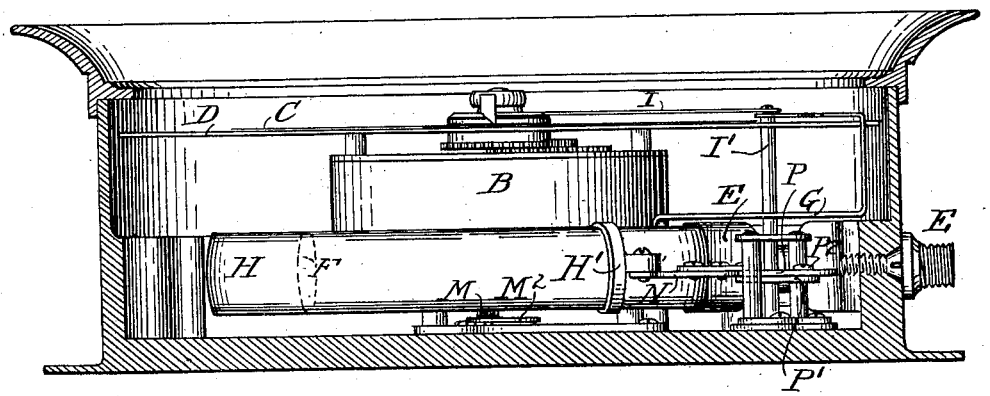
Figure 3:
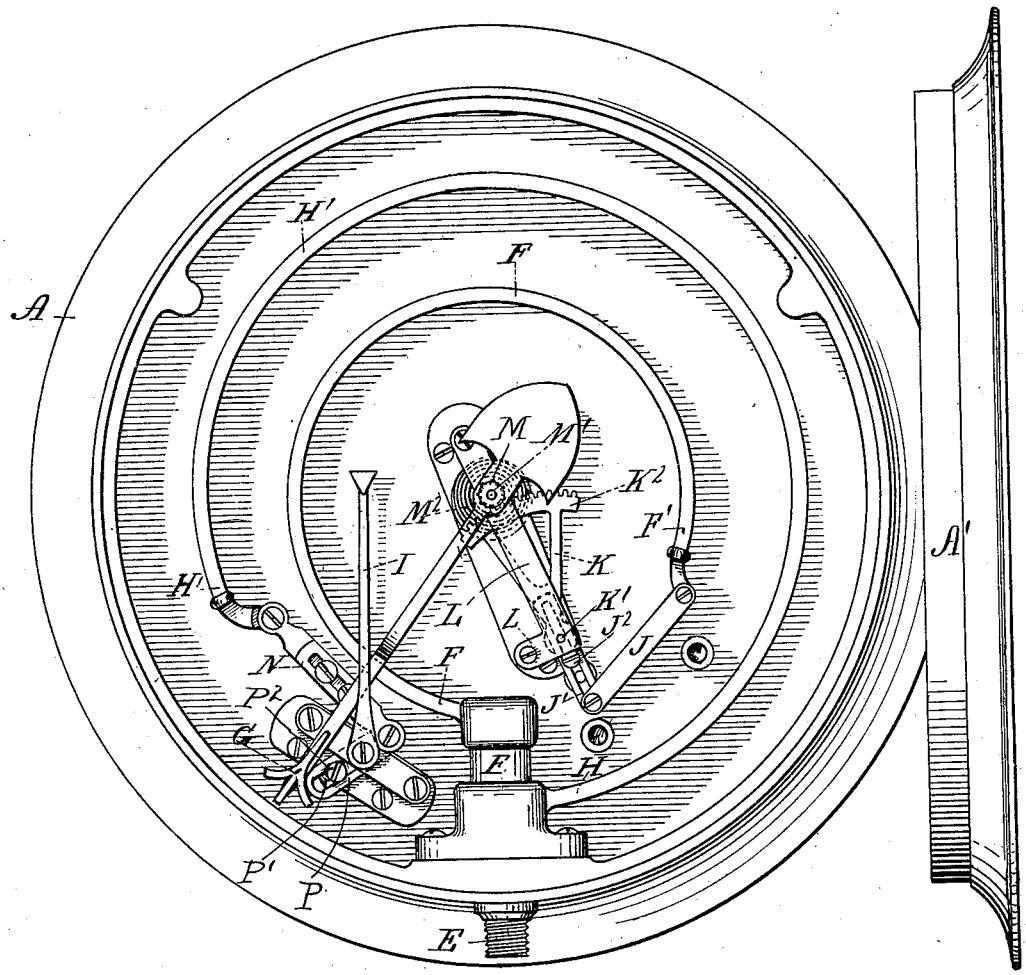

Figure 1 is a plan of the dial-face of a gage embodying my invention and shown as indicating a boiler-pressure of one hundred pounds and making a record-mark accordingly. Fig. 2 is a similar plan of the gage with the dials removed and the clockwork in place and showing the principal parts of the mechanisms for actuating under steam-pressure the pressure-index and the recording devices. Fig. 3 is a similar plan with the clockwork removed and showing clearly the independent actuating devices for moving under steam-pressure the pressure-index and the marking or recording devices, respectively. Fig. 4 is a cross-section taken as on line 4 4, Fig. 1, and as viewed from the left of said line; and Fig. 5 is a side elevation of the gage with the case in section and as viewed from the left of Fig. 1.

The gage, as illustrated in the accompanying three sheets of drawings, comprises a circular case A, having a hinged rim A', holding the usual glass cover, a clockwork B, centrally located within the case, and employed to revolve a detachable record-dial C once in twenty-four hours; a stationary dial D, surrounding dial C, which is graduated from "0" to "300" and on which the number of pounds of steam-pressure on the boiler may be indicated and expressed; an inlet-pipe and passage E, through which steam is admitted from the boiler to a pair of Bourdon tubes F and H within the casing, tube F being attached to the inner end of the inlet-pipe and curved therefrom to the left in the arc of a circle and having its free end F' connected with adjustable devices for turning the pressure-index G, and tube H, attached to the outer part of the inlet and curved therefrom to the right in the arc of a circle and having its free end H' connected with adjustable devices for turning the marking arm or tracer I, which acts on the detachable clock-dial C. Steam passes from the boiler through inlet E directly into the tubes F and H with equal pressure. The tendency of the steam-pressure in these tubes, as is well known, is to straighten them or expand the arcs of their circles, thus causing an elastic movement of their free ends F' and H' according to the force of the variable steam-pressure. This movement is made available to turn the pressure-index G in one case and to swing the marking or tracing arm I in the other. The movement of the end F' of the spring-tube F acts upon index G through the following adjustable connections, namely: A link J is connected at one end to the end F' of tube F and at its opposite end to a slotted link J', which adjustably overlies the outer end of the sector-lever K, which turns on the pivot K', seated in a bedplate and supported by a raised angle-plate L, which is also secured to the bed-plate. An adjusting-screw $J^2$ secures link J' and the end of the sector-lever K together and is adjustable lengthwise along the slot and into holes in the underlying lever to extend the link and change the leverage. The sector $K^2$ meshes with a pinion M, secured to a vertical rotating spindle M', on which the index G is fixed to turn therewith beneath the clockwork and is actuated by and in accordance with the movement of the end F' of tube F. The index G is returned to its idle position at O on the dial D when the steam-pressure is off by a light coiled spring $M^2$, which normally resists its rotary movement from that position.

The movement of end H' of tube H is transmitted to arm I, which carries the pencil or other means for tracing a devious line on the dial C, through the adjustable connecting-link N, attached at one end to the spring-tube H' and at its opposite end to a slotted link P, which is adjustable on the lever-arm P', secured to the vertical spindle I', on which arm I is secured and arranged to swing. The link P is adjustable longitudinally on arm P' to vary the leverage and is secured in position by screw $P^2$, threaded into the arm through the slot in the sliding link P, and the head of which overlaps the top of the link and clamps it to the arm. The office of the spring-tube F is to vibrate the pressure-index G through the adjustable connections described and in accordance with the variable steam-pressure as measured by the graduated dial traversed by the index, and the office of the tubular spring H' is to vibrate the tracing-arm I through its adjustable connections described and in accordance with the various degrees of steam-pressure as indicated by the devious line traced on dial C. These two indicating devices are moved directly and simultaneously by the steam-pressure, but are entirely independent of each other in their mechanical operations. The tube H, being of larger circumference, is made thicker and stronger to sustain the same pressure of steam that the tube F of smaller diameter sustains, and the movement required of the free end of tube H is but little—practically about one-sixteenth to one-eighth of an inch—to effect the proper range of marking-index I through the intermediate multiplying-lever connections. Consequently the liability of spring H to "set" or otherwise to become inoperative is very slight, and thus it serves as a very reliable detector of any fault in its companion spring F, which is smaller in diameter and larger movement—practically about five-sixteenths to three-eighths of an inch—and more liable to such failure. When properly adjusted, however, the two mechanisms should agree in the results of their separate indicating operations, the outer one giving an exact record on dial C from an independent pressure movement of what the inner one indicates on dial D as the true boiler-pressure at the time indicated. Thus the failure of either to perform its office perfectly will be readily made manifest by the other and lead to prompt correction of the faulty one. The tracer carried by arm I and acting on a dial rotated with the precision and regularity of a clock-movement will, having no other purpose to perform, secure the highest degree of accuracy and reliability, and the mechanical movement for actuating the pressure-index to the stationary dial being relieved of the duty to trace the record on the clock-driven dial acts with greater sensitiveness and less liability to derangement.

Two independent mechanisms—one for indicating boiler-pressure on a stationary dial and one for tracing a record of the same on a moving dial—have proved to be more satisfactory and reliable in a gage than the method heretofore employed of accomplishing both said purposes with a single mechanism, such as one Bourdon tube with both index and tracing connections, and the principal feature of my present invention consists in providing a gage having separate and independent means for actuating under steam-pressure the pressure-index and for making a record of the pressure simultaneously therewith.

Having thus described my invention, I claim—

1. A steam-gage embodying the combination of an inclosing case; a fixed dial secured to the case, and graduated and numbered to express the number of pounds pressure on the boiler; a detachable dial rotated by clock-work within the case, and graduated and numbered as described; and two independent indicating mechanisms operated simultaneously by the steam-pressure, one marking a record on the movable dial while the other indicates the same result on the fixed dial, and the two being combined and arranged to coöperate in securing a more reliable gage by each serving a special purpose, as described, and together affording a means of readily detecting any faulty action in either, substantially as specified.

2. A steam-gage embodying the combination of an inclosing case; a dial fixed to the case and graduated and numbered to express on its face the number of pounds pressure on the boiler; an index operated by the steam-pressure acting on mechanism comprising a Bourdon tube attached to a steam-inlet and suitable connecting mechanism attached to the free end of the tube and constructed and arranged to turn the index-spindle; a detachable dial rotated by clockwork, and graduated and numbered as described; and a marking-index adapted to trace a line on the moving dial and operated by the steam-pressure acting on mechanism comprising an additional Bourdon tube, attached to the steam-inlet, and connected by a system of adjustable levers, with the axis of the tracing-index; all substantially as specified.

3. A steam-gage embodying the combination of an inclosing case A, a graduated and numbered dial D, fixed to the case; a detachable dial C, rotated by clockwork within the case, and graduated and numbered as described; two separate and independent indicating mechanisms operated by the steam-pressure, one to actuate index G, to indicate on dial D, and comprising a Bourdon tube, or tubular spring F, attached at one end to the steam-inlet E and at its free end F' connected by a link J, to an adjustable slotted link J' secured by a screw $J^2$ to a sector-lever K, turning on a pivot K' and the sector $K^2$ meshing with a pinion M, on the spindle M' which turns the index G; and the other to actuate the tracing-arm to indicate on dial C, and comprising an outer Bourdon tube, or tubular spring H, attached at one end to the inlet E, and at its free end H' connected by an adjustable link N, with a slotted adjustable link P, secured to a lever-arm P' by a screw P², the arm being attached to a vertical spindle I' by which index I is turned: the two independent indicating mechanisms being operated directly and simultaneously by the steam-pressure and so as to agree in their separate dial indications, all substantially as and for the purposes specified.

COLEMAN J. MANNING.

Witnesses:
   EUGENE HUMPHREY,
   W. E. JERAULD.